US012392169B2

(12) United States Patent
Wang et al.

(10) Patent No.: US 12,392,169 B2
(45) Date of Patent: Aug. 19, 2025

(54) DEVICE WITH LOCK FUNCTION AND LOCK MECHANISM

(71) Applicant: Wiwynn Corporation, New Taipei (TW)

(72) Inventors: Kuan-Chih Wang, New Taipei (TW); Hung-Chien Wu, New Taipei (TW); Fu-Sheng Cheng, New Taipei (TW); Po-Han Huang, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 116 days.

(21) Appl. No.: 18/519,098

(22) Filed: Nov. 27, 2023

(65) Prior Publication Data

US 2024/0279962 A1 Aug. 22, 2024

(30) Foreign Application Priority Data

Feb. 21, 2023 (TW) ................................ 112106240

(51) Int. Cl.
*A47B 88/00* (2017.01)
*E05B 65/46* (2017.01)

(52) U.S. Cl.
CPC .................................... *E05B 65/46* (2013.01)

(58) Field of Classification Search
CPC .... E05B 65/46; H05K 7/1401; H05K 7/1488; H05K 7/183
See application file for complete search history.

(56) References Cited

U.S. PATENT DOCUMENTS

| | | | | |
|---|---|---|---|---|
| 5,207,781 A * | 5/1993 | Rock | A47B 88/467 | 312/319.1 |
| 8,459,758 B2 * | 6/2013 | Rechberg | A47B 88/467 | 312/319.1 |
| 2009/0013732 A1 * | 1/2009 | Gianelo | E05B 65/46 | 312/333 |

FOREIGN PATENT DOCUMENTS

| | | |
|---|---|---|
| CN | 113163655 A | 7/2021 |
| TW | 200945994 | 11/2009 |

* cited by examiner

*Primary Examiner* — Amy J. Sterling
(74) *Attorney, Agent, or Firm* — Winston Hsu

(57) ABSTRACT

A device with lock function includes a housing, a casing and a lock mechanism. The housing has a first engaging portion. The lock mechanism includes a frame, a lock member, a first elastic member, an operating member and an unlock member. The frame has a second engaging portion. The lock member has a third engaging portion engaging with the first engaging portion to lock the casing in the housing. The unlock member has a fourth engaging portion engaging with the second engaging portion to restrain the operating member. When the unlock member is pressed, the fourth engaging portion disengages from the second engaging portion and the first elastic member drives the lock member to move toward an inside of the frame, such that the third engaging portion disengages from the first engaging portion and the lock member drives the operating member to move toward an outside of the frame.

20 Claims, 14 Drawing Sheets

DEVICE WITH LOCK FUNCTION AND LOCK MECHANISM

BACKGROUND OF THE INVENTION

1. Field of the Invention

The invention relates to a lock mechanism and, more particularly, to a lock mechanism that is easy to operate and occupies less space and a device equipped with the lock mechanism.

2. Description of the Prior Art

With the rise of big data, machine learning, the Internet of Things, and various network platforms, the demand for servers in life is getting higher and higher. Since the server is a hardware that requires frequent maintenance, a chassis of the server is usually installed in a rack by a sliding manner. To prevent the server from sliding out of the rack due to vibration or other external forces, a lock mechanism must be disposed on the server to lock the server in the rack. However, the lock mechanism of the conventional server is not easy to operate and occupies much space, such that it is not beneficial for maintenance and design of the server.

SUMMARY OF THE INVENTION

According to an embodiment of the invention, a device with lock function comprises a housing, a casing and a lock mechanism. The housing has a first engaging portion. The casing is disposed in the housing. The lock mechanism is disposed in the casing. The lock mechanism comprises a frame, a lock member, a first elastic member, an operating member and an unlock member. The frame is fixed on the casing. The frame has a second engaging portion. The lock member is movably disposed in the frame. The lock member has a third engaging portion. The third engaging portion engages with the first engaging portion to lock the casing in the housing. The first elastic member is connected to the lock member. The operating member is movably disposed in the frame. The unlock member is movably connected to the operating member. The unlock member has a fourth engaging portion. The fourth engaging portion engages with the second engaging portion to restrain the operating member. When the unlock member is pressed, the fourth engaging portion disengages from the second engaging portion and the first elastic member drives the lock member to move toward an inside of the frame, such that the third engaging portion disengages from the first engaging portion and the lock member drives the operating member to move toward an outside of the frame.

According to another embodiment of the invention, a lock mechanism comprises a frame, a lock member, a first elastic member, an operating member and an unlock member. The lock member is movably disposed in the frame. The first elastic member is connected to the lock member. The operating member is movably disposed in the frame. The unlock member is movably connected to the operating member. The unlock member engages with the frame. When the unlock member is pressed, the unlock member disengages from the frame, the first elastic member drives the lock member to move toward an inside of the frame, and the lock member drives the operating member to move toward an outside of the frame.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
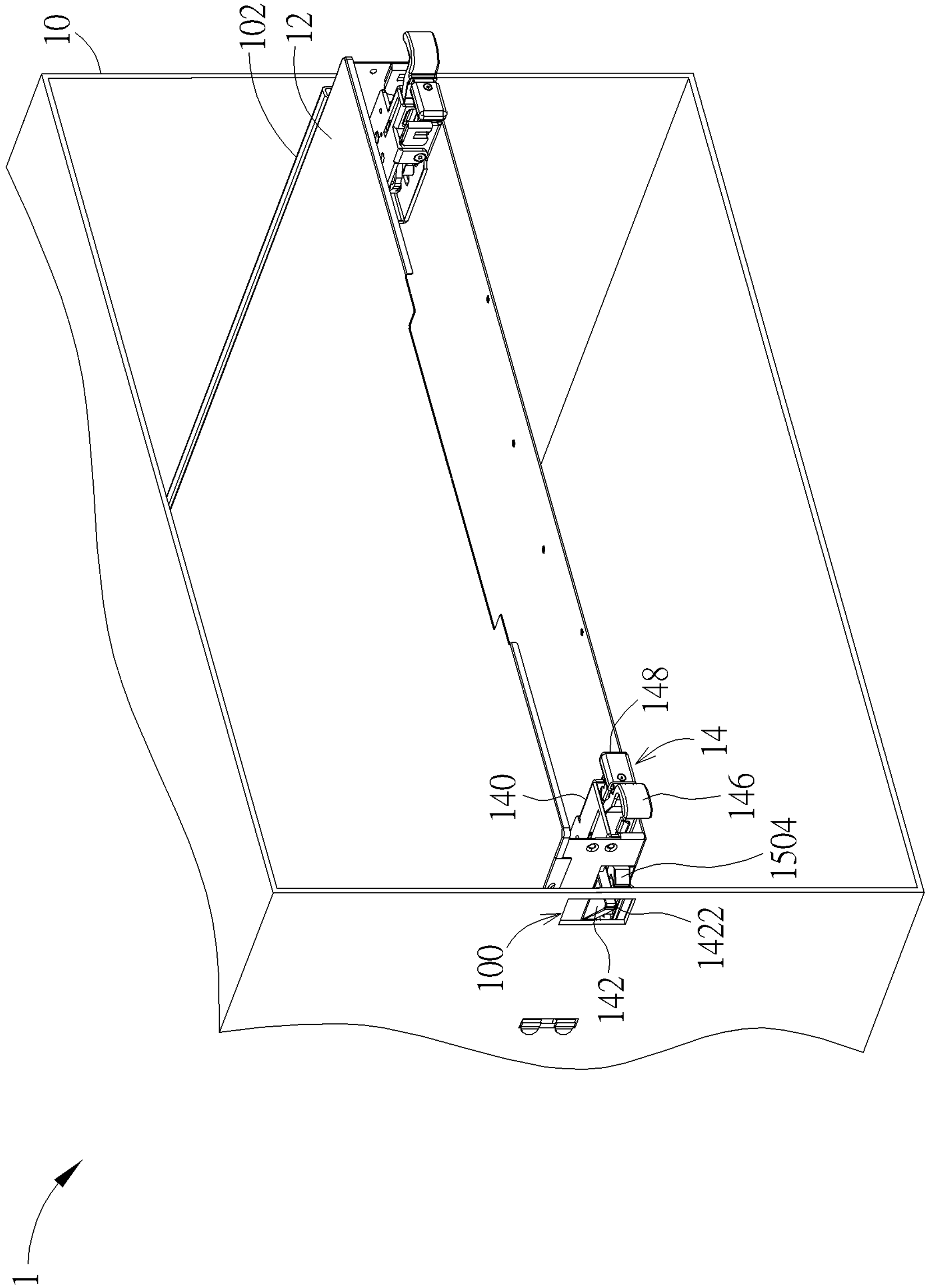
FIG. 1 is a perspective view illustrating a device with lock function according to an embodiment of the invention.
Figure 2:
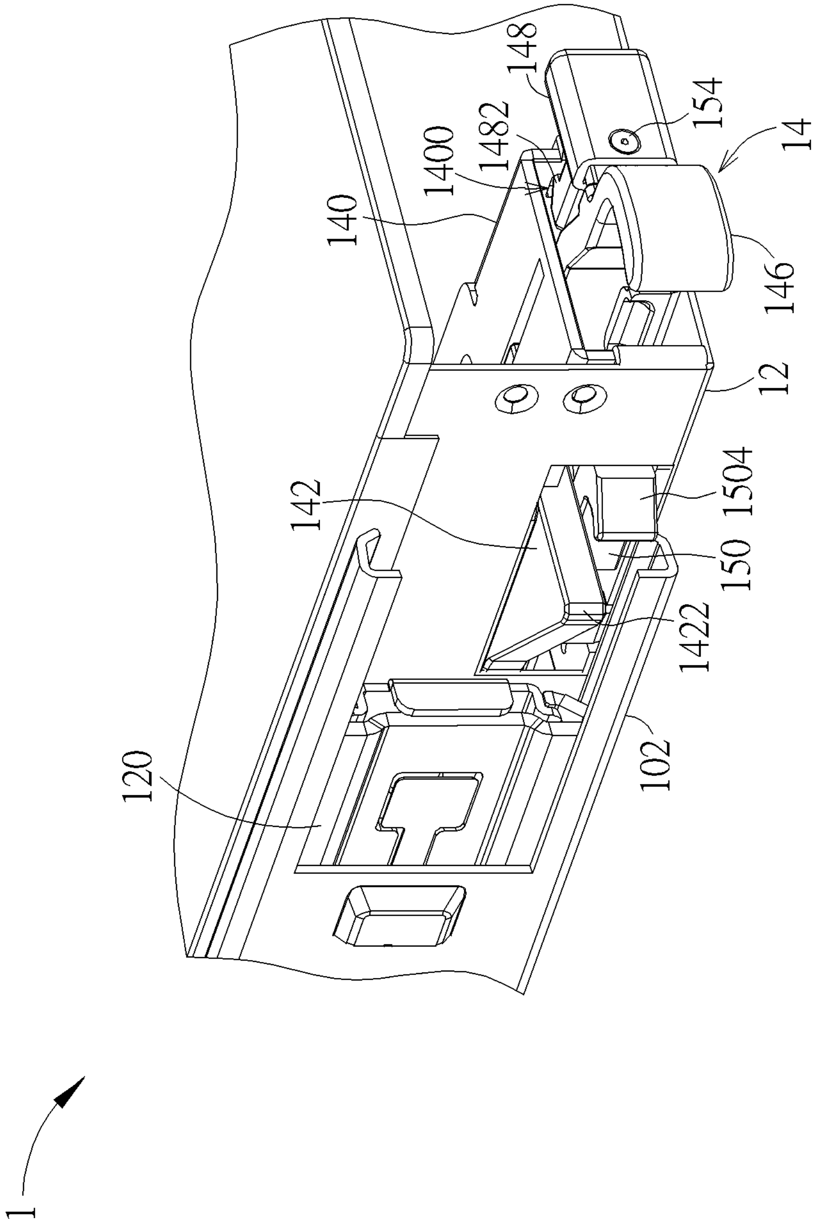
FIG. 2 is a partial perspective view illustrating the device shown in FIG. 1 without a housing.
Figure 3:
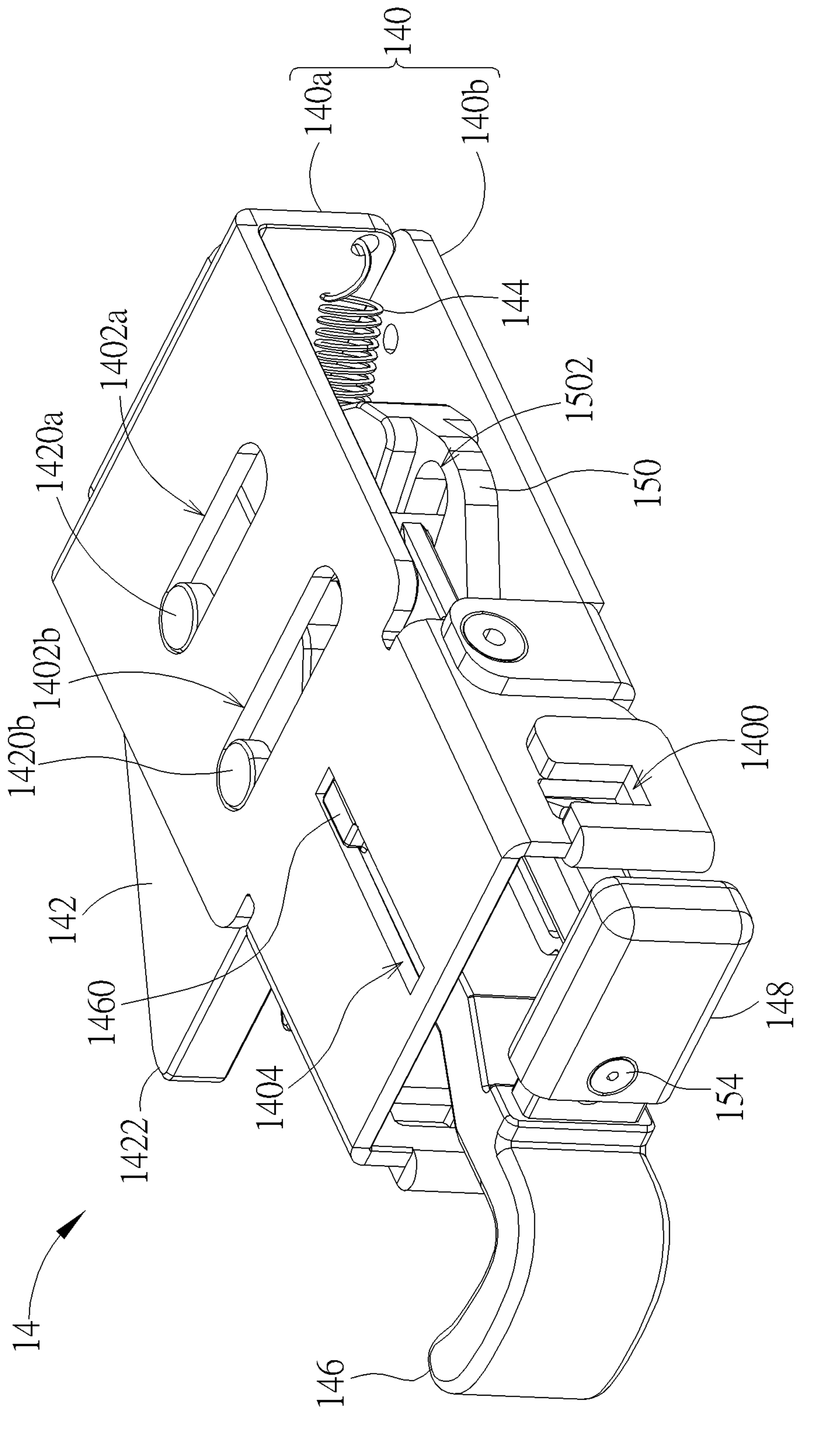
FIG. 3 is a perspective view illustrating a lock mechanism shown in FIG. 2 from another viewing angle.
Figure 4:
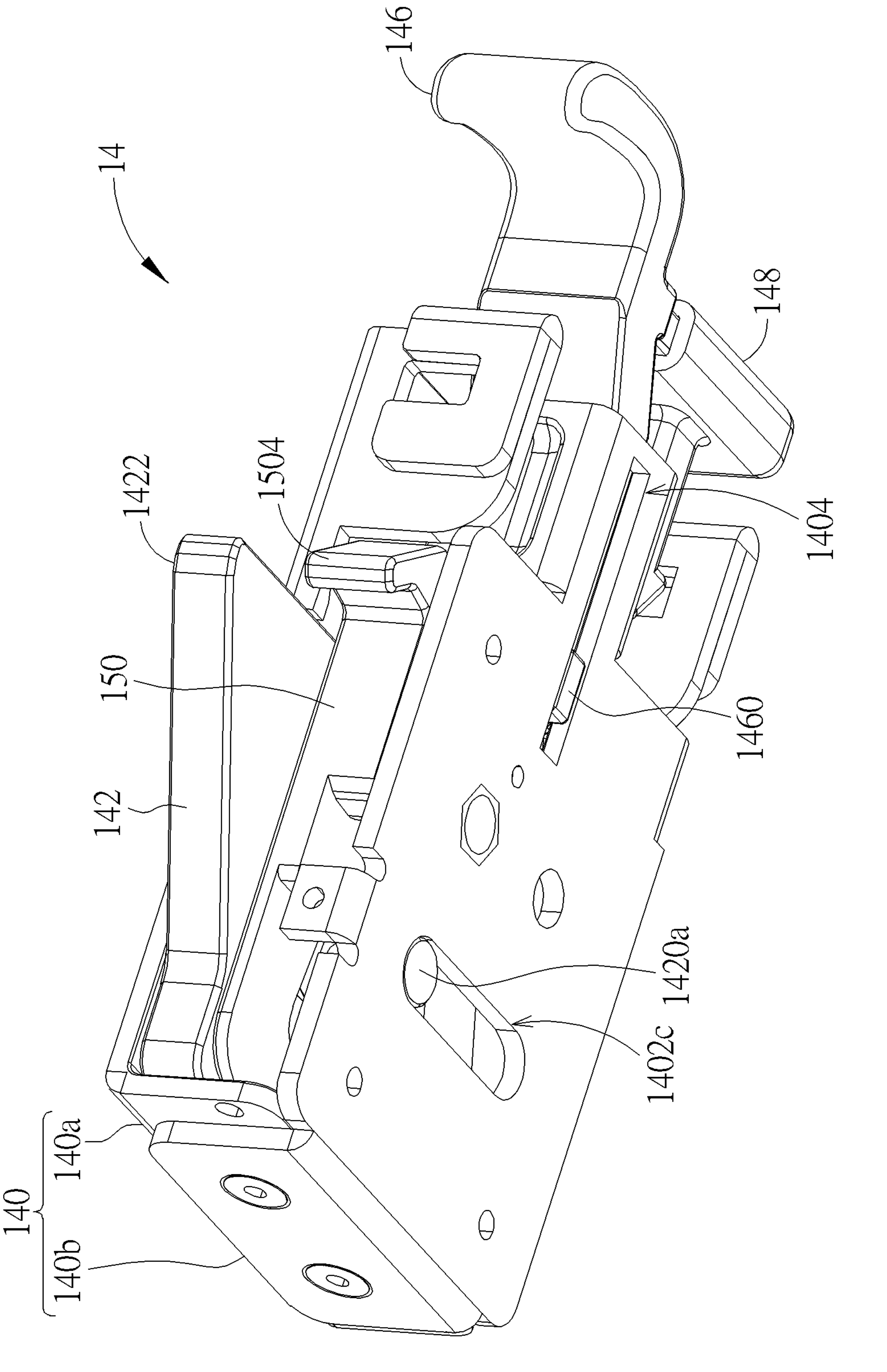
FIG. 4 is a perspective view illustrating the lock mechanism shown in FIG. 2 from another viewing angle.
Figure 5:
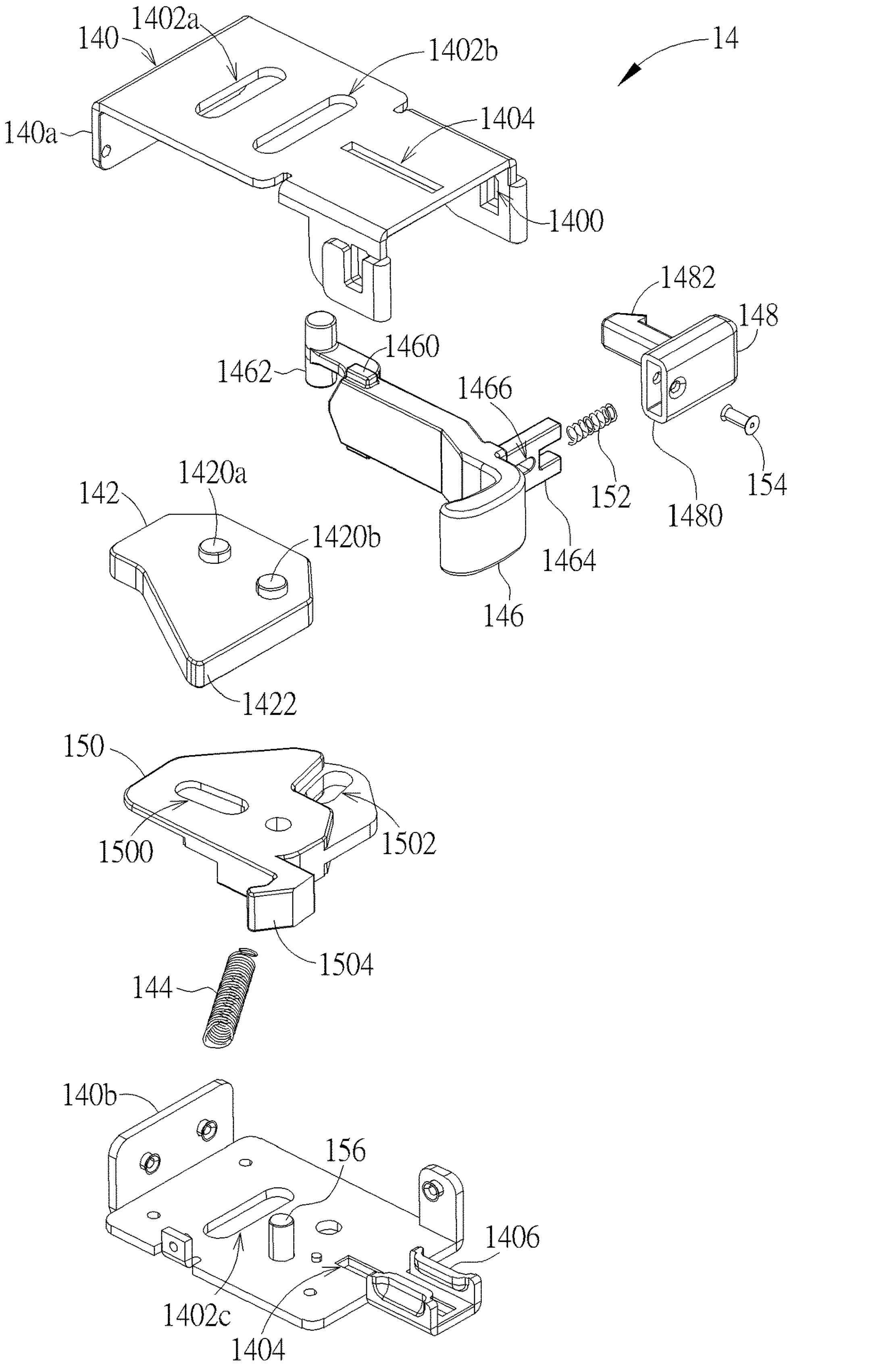
FIG. 5 is an exploded view illustrating the lock mechanism shown in FIG. 2.
Figure 6:
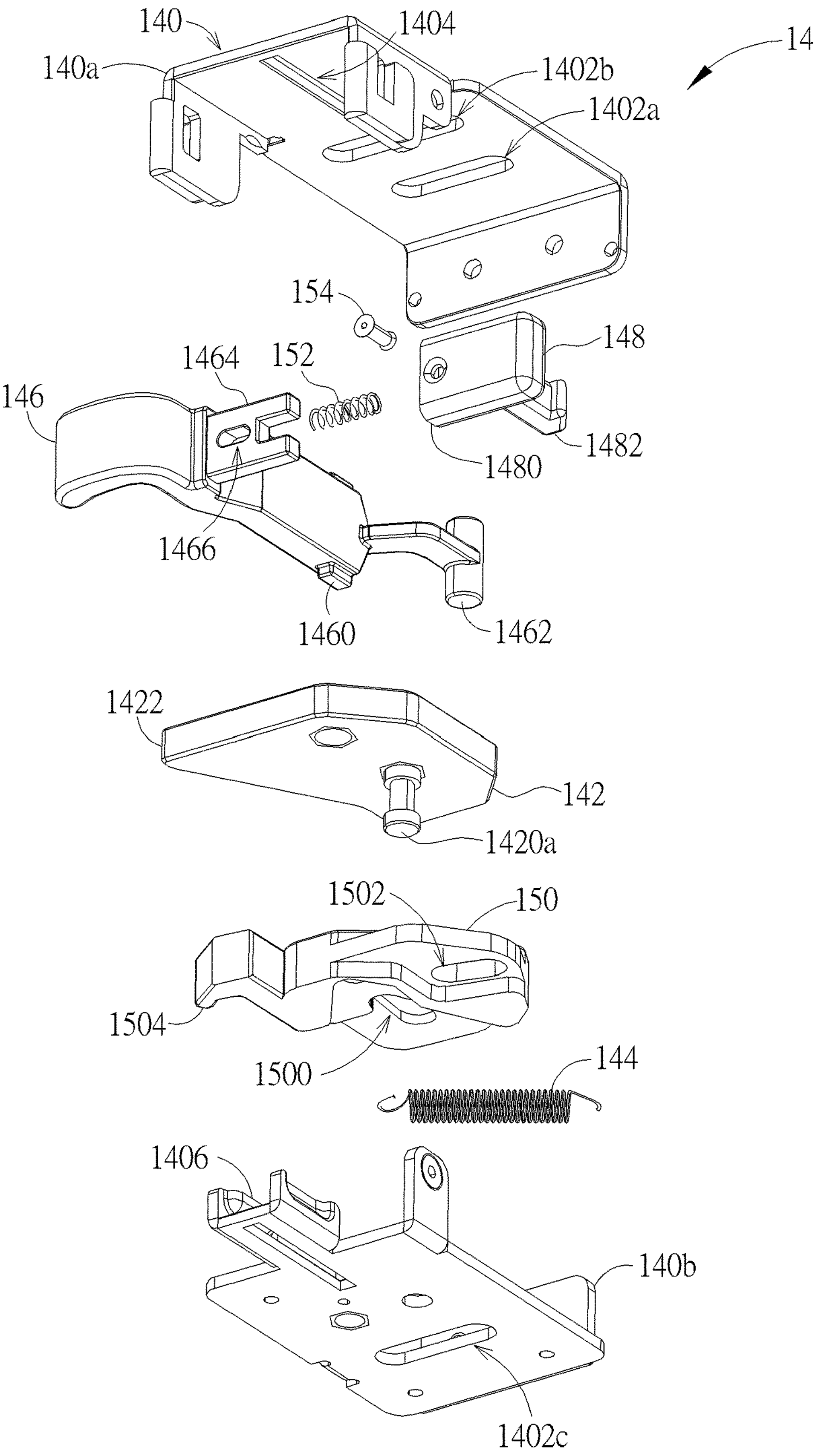
FIG. 6 is an exploded view illustrating the lock mechanism shown in FIG. 2 from another viewing angle.
Figure 7:
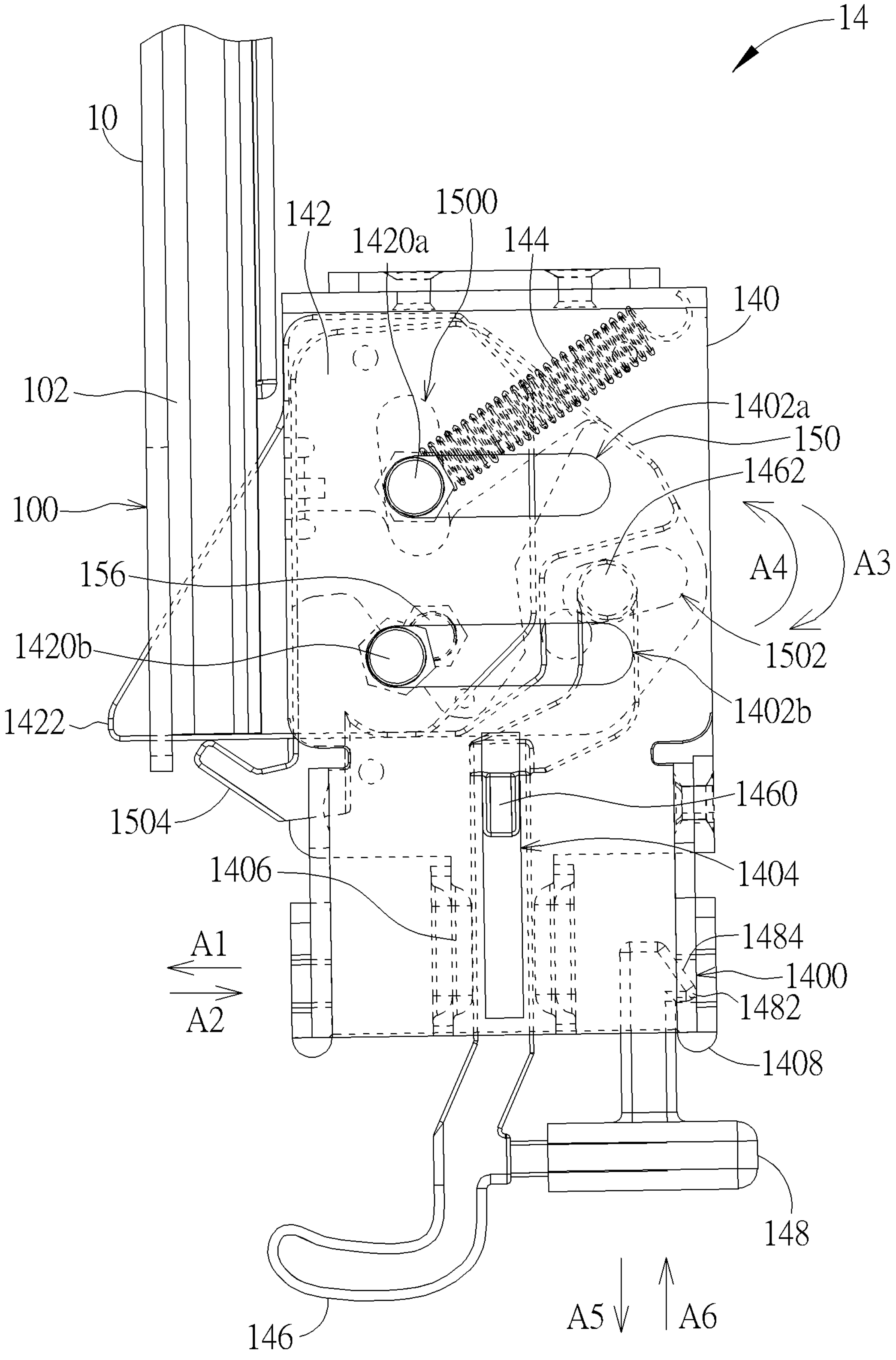
FIG. 7 is a top view illustrating the lock mechanism in a lock state.
Figure 8:
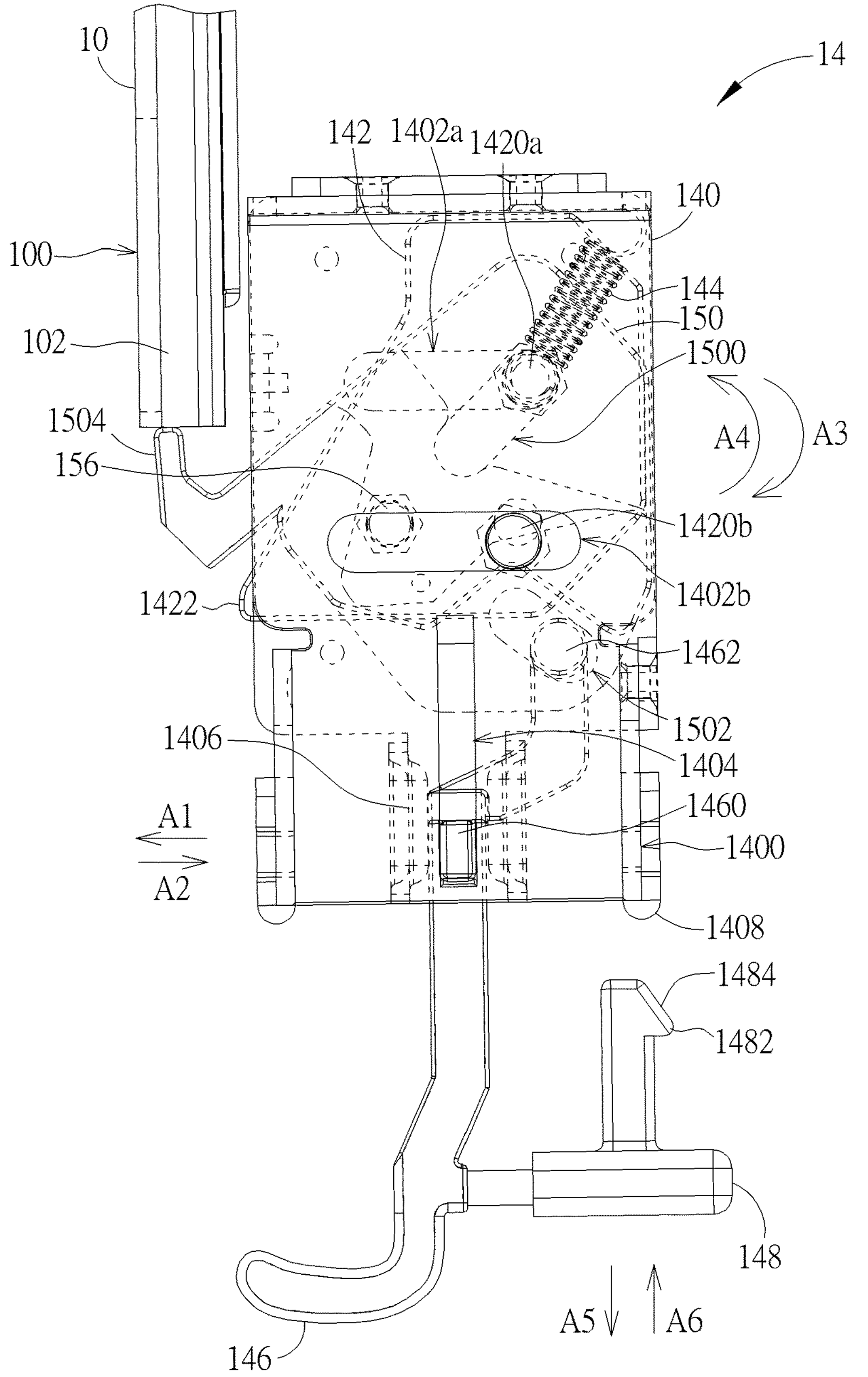
FIG. 8 is a top view illustrating the lock mechanism in an unlock state.

Referring to FIGS. 1 to 8, FIG. 1 is a perspective view illustrating a device 1 with lock function according to an embodiment of the invention, FIG. 2 is a partial perspective view illustrating the device 1 shown in FIG. 1 without a housing 10, FIG. 3 is a perspective view illustrating a lock mechanism 14 shown in FIG. 2 from another viewing angle, FIG. 4 is a perspective view illustrating the lock mechanism 14 shown in FIG. 2 from another viewing angle, FIG. 5 is an exploded view illustrating the lock mechanism 14 shown in FIG. 2, FIG. 6 is an exploded view illustrating the lock mechanism 14 shown in FIG. 2 from another viewing angle, FIG. 7 is a top view illustrating the lock mechanism 14 in a lock state, and FIG. 8 is a top view illustrating the lock mechanism 14 in an unlock state.

As shown in FIG. 1, the device 1 with lock function comprises a housing 10, a casing 12 and a lock mechanism 14. The casing 12 is disposed in the housing 10 and the lock mechanism 14 is disposed in the casing 12, wherein the lock mechanism 14 is configured to lock the casing 12 in the housing 10. In an embodiment, the housing 10 may be a rack for installing a server and the casing 12 may be a chassis of the server. Thus, the lock mechanism 14 may be configured to lock the chassis of the server in the rack. It should be noted that the device 1 may also be other electronic or non-electronic devices requiring lock function according to practical application.

As shown in FIGS. 1 and 2, the housing 10 has a first engaging portion 100 and a rail 102. A position of the first engaging portion 100 corresponds to a position of the lock mechanism 14. In this embodiment, the first engaging portion 100 may be, but is not limited to, an engaging hole. In practical applications, two lock mechanisms 14 may be disposed at opposite sides of the casing 12 and two first engaging portions 100 may be formed at opposite sides of the housing 10 correspondingly, such that the lock and unlock operations of the casing 12 are more stable. Needless to say, in some embodiments, one lock mechanism 14 may be disposed only at one side of the casing 12 and one first engaging portion 100 is formed at one side of the housing correspondingly according to practical applications. Furthermore, the casing 12 has a track 120. The track 120 is able to slide in the rail 102, such that the casing 12 is installed in the housing 10 by a sliding manner. In practical applications, two rails 102 may be disposed at two inner walls of the housing 10 and two tracks 120 may be disposed at two outer walls of the casing 12.

As shown in FIGS. 3 to 6, the lock mechanism 14 comprises a frame 140, a lock member 142, a first elastic member 144, an operating member 146, an unlock member 148, a rotating member 150, a second elastic member 152 and a restraining member 154.

In this embodiment, the frame 140 may comprise an upper cover 140*a* and a lower cover 140*b*, but the invention is not so limited. The frame 140 is fixed on the casing 12 and the frame 140 has a second engaging portion 1400. In this embodiment, the second engaging portion 1400 may be, but is not limited to, an engaging hole located at a side of the upper cover 140*a*.

The lock member 142 is movably disposed in the frame 140. The frame 140 may have a sliding groove and the lock member 142 may have a sliding portion. The sliding portion is disposed in the sliding groove, such that the lock member 142 is movably disposed in the frame 140. In this embodiment, the upper cover 140*a* of the frame 140 may have two sliding grooves 1402*a*, 1402*b*, the lover cover 140*b* of the frame 140 may have a sliding groove 1402*c*, and the lock member 142 may have two sliding portions 1420*a*, 1420*b*. The sliding portion 1420*a* may extend from opposite sides of the lock member 142 to be disposed in the sliding groove 1402*a* of the upper cover 140*a* and the sliding groove 1402*c* of the lower cover 140*b*. The sliding portion 1420*b* may extend from one side of the lock member 142 to be disposed in the sliding groove 1402*b* of the upper cover 140*a*. It should be noted that the number of the sliding grooves and the sliding portions may be determined according to practical applications, so the invention is not limited to the embodiment illustrated in the figures. Furthermore, the lock member 142 has a third engaging portion 1422. The third engaging portion 1422 is configured to engage with the first engaging portion 100 of the housing 10 to lock the casing 12 in the housing 10. In this embodiment, the third engaging portion 1422 may be, but is not limited to, an engaging protrusion.

The first elastic member 144 is connected to the lock member 142. In this embodiment, the first elastic member 144 may be a tension spring, wherein opposite ends of the first elastic member 144 may be connected to the sliding portion 1420*a* of the lock member 142 and the upper cover 140*a* of the frame 140.

The operating member 146 is movably disposed in the frame 140. In this embodiment, the frame 140 may have a positioning groove 1404 and the operating member 146 may have a positioning portion 1460. The positioning portion 1460 is disposed in the positioning groove 1404, such that the operating member 146 is movably disposed in the frame 140. In this embodiment, an extending direction of each of the sliding grooves 1402*a*, 1402*b*, 1402*c* is perpendicular to an extending direction of the positioning groove 1404, such that a moving direction of the lock member 142 is perpendicular to a moving direction of the operating member 146. In this embodiment, each of the upper cover 140*a* and the lower cover 140*b* of the frame may have a positioning groove 1404 and opposite sides of the operating member 146 may have two positioning portions 1460. Still further, the lower cover 140*b* of the frame 140 may have two retaining walls 1406. The operating member 146 may be sandwiched in between the two retaining walls 1406 to stabilize the installation of the operating member 146.

The rotating member 150 is pivotally connected to the lower cover 140*b* of the frame 140 by a pivot 156. In this embodiment, the rotating member 150 may have a first driving groove 1500 and a second driving groove 1502. Furthermore, the operating member 146 may have a linking portion 1462. The sliding portion 1420*a* of the lock member 142 may be disposed in the first driving groove 1500 of the rotating member 150, and the linking portion 1462 of the operating member 146 may be disposed in the second driving groove 1502 of the rotating member 150.

The unlock member 148 is movably connected to the operating member 146. In this embodiment, the operating member 146 may have an inserting portion 1464 and the unlock member 148 may have a sleeve portion 1480. The sleeve portion 1480 is sleeved on the inserting portion 1464 and the second elastic member 152 is disposed in the sleeve portion 1480, wherein opposite ends of the second elastic member 152 are connected to the inserting portion 1464 and the sleeve portion 1480. In this embodiment, the second elastic member 152 may be a compression spring. Furthermore, the inserting portion 1464 may have a restraining groove 1466. After the sleeve portion 1480 is sleeved on the inserting portion 1464, the restraining member 154 is disposed on the sleeve portion 1480 and located in the restraining groove 1466, so as to prevent the unlock member 148 from coming off the operating member 146. Still further, the unlock member 148 has a fourth engaging portion 1482. The fourth engaging portion 1482 is configured to engage with the second engaging portion 1400 of the frame 140 to restrain the operating member 146. In this embodiment, the fourth engaging portion 1482 may be, but is not limited to, an engaging hook.

As shown in FIGS. 1 and 7, the casing 12 may be locked in the housing 10 by the lock mechanism 14. For further explanation, the third engaging portion 1422 of the lock member 142 engages with the first engaging portion 100 of the housing 10 to lock the casing 12 in the housing 10. At the same time, the fourth engaging portion 1482 of the unlock member 148 engages with the second engaging portion 1400 of the frame 140 to restrain the operating member 146. At this time, the first elastic member 144 is stretched. When a user wants to take the casing 12 out of the housing 10, the user may hold the operating member 146 with an index finger and press the unlock member 148 with a thumb in a direction of an arrow A1. When the unlock member 148 is pressed, the fourth engaging portion 1482 disengages from the second engaging portion 1400. At this time, the first elastic member 144 drives the lock member 142 to move toward an inside of the frame 140 (see a direction of an arrow A2), such that the third engaging portion 1422 disengages from the first engaging portion 100, as shown in FIG. 8. When the first elastic member 144 drives the lock member 142 to move toward the inside of the frame 140, the sliding portion 1420*a* of the lock member 142 pushes the first driving groove 1500 of the rotating member 150 to drive the rotating member 150 to rotate toward a direction of an arrow A3. When the rotating member 150 rotates toward the direction of the arrow A3, the second driving groove 1502 of the rotating member 150 pushes the linking portion 1462 of the operating member 146 to drive the operating member 146 to move toward an outside of the frame 140 (see a direction of an arrow A5). In other words, in this embodiment, when the unlock member 148 is pressed, the lock member 142 indirectly drives the operating member 146 to move toward the outside of the frame 140 through the rotating member 150, so as to facilitate the user to hold the operating member 146. Accordingly, the user may pull the operating member 146 to pull the casing 12 out of the housing 10 easily.

When the user wants to install the casing 12 into the housing 10, the user may push the casing 12 into the housing 10 along the rail 102. In this embodiment, the rotating member 150 has a protruding portion 1504. When the casing 12 is pushed into the housing 10 along the rail 102, the protruding portion 1504 is pushed by the rail 102 to drive the rotating member 150 to rotate toward a direction of an arrow A4. When the rotating member 150 rotates toward the direction of the arrow A4, the first driving groove 1500 of the rotating member 150 pushes the sliding portion **1420*a* of the lock member 142 to drive the lock member 142 to move toward the outside of the frame 140 (see the direction of the arrow A1) and the second driving groove 1502 of the rotating member 150 pushes the linking portion 1462 of the operating member 146 to drive the operating member 146 to move toward the inside of the frame 140 (see a direction of an arrow A6), such that the third engaging portion 1422 of the lock member 142 engages with the first engaging portion 100 of the housing 10 and the fourth engaging portion 1482 of the unlock member 148 engages with the second engaging portion 1400 of the frame 140. In this embodiment, the fourth engaging portion 1482 of the unlock member 148 has an inclined surface 1484. When the operating member 146 moves toward the inside of the frame 140 (see the direction of the arrow A6), a side wall 1408 of the frame 140 pushes the inclined surface 1484, such that the unlock member 148 moves toward the operating member 146 (see the direction of the arrow A1). After the fourth engaging portion 1482 of the unlock member 148 is aligned with the second engaging portion 1400 of the frame 140, the second elastic member 152 returns the unlock member 148 toward the direction of the arrow A2, such that the fourth engaging portion 1482 of the unlock member 148 engages with the second engaging portion 1400 of the frame 140. Accordingly, when the user pushes the casing 12 into the housing 10, the invention may achieve auto-lock function by the cooperating between the protruding portion 1504 and the sliding rail 102**.

It should be noted that the invention may also omit the aforesaid protruding portion 1504. When the user pushes the casing 12 into the housing 10, the user only needs to push the operating member 146 toward the inside of the frame 140 (see the direction of the arrow A6) and then the lock member 142 can be driven to move toward the outside of the frame 140 (see the direction of the arrow A1) to lock the casing 12 in the housing 10.

Figure 9:
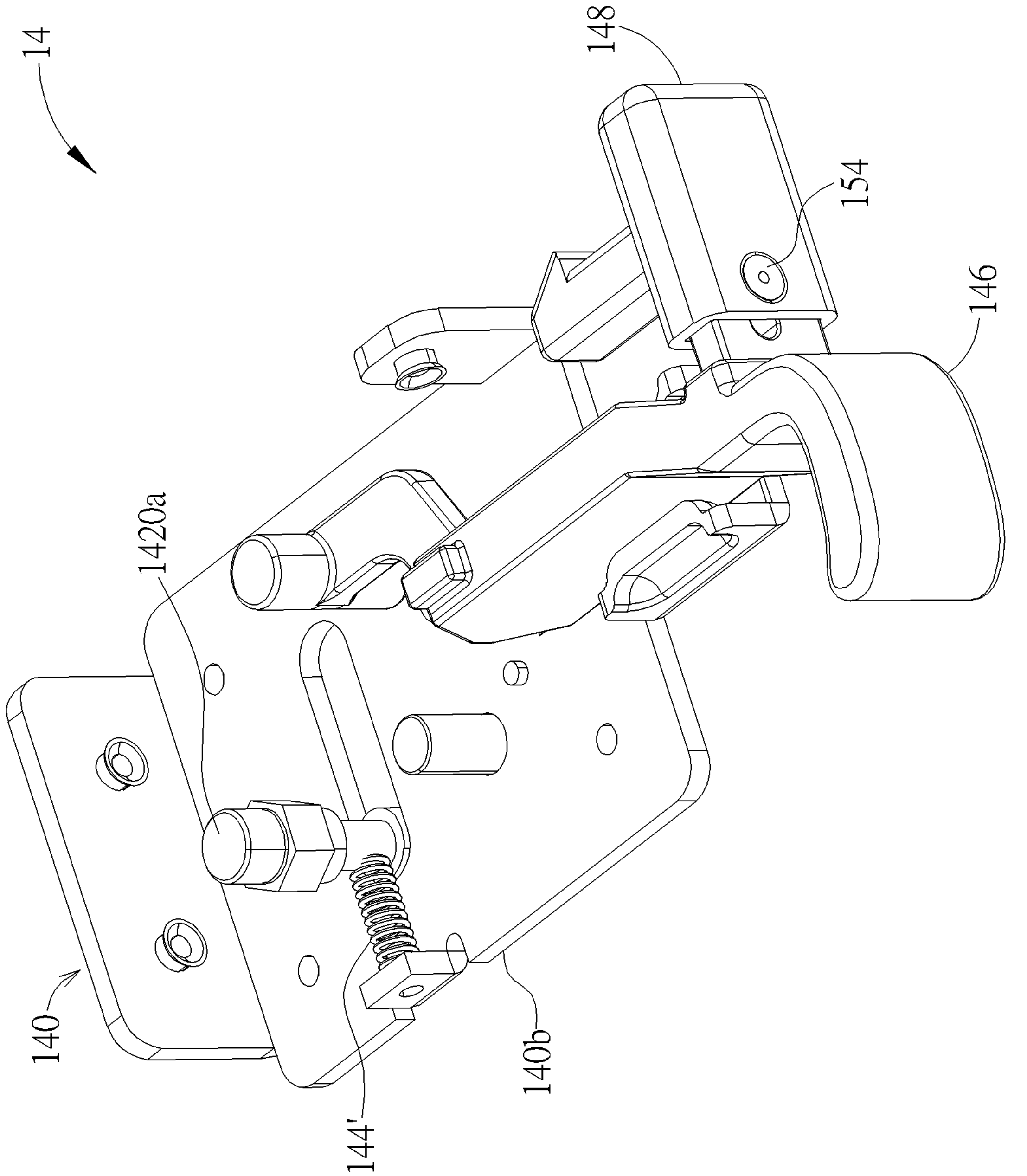
FIG. 9 is a partial perspective view illustrating the lock mechanism equipped with a first elastic member.

Referring to FIG. 9, FIG. 9 is a partial perspective view illustrating the lock mechanism 14 equipped with a first elastic member 144'. As shown in FIG. 9, the first elastic member 144' may be a compression spring, wherein opposite ends of the first elastic member 144' are connected to the sliding portion **1420*a* and the lower cover 140*b* of the frame 140. The first elastic member 144 shown in FIGS. 7 and 8 may be replaced by the first elastic member 144' shown in FIG. 9. When the lock mechanism 14 is in a lock state shown in FIG. 7, the first elastic member 144' is compressed. As shown in FIG. 8, when the unlock member 148 is pressed, the first elastic member 144' drives the lock member 142 to move toward the inside of the frame 140 (see the direction of the arrow A2), such that the third engaging portion 1422 disengages from the first engaging portion 100**.

Figure 10:
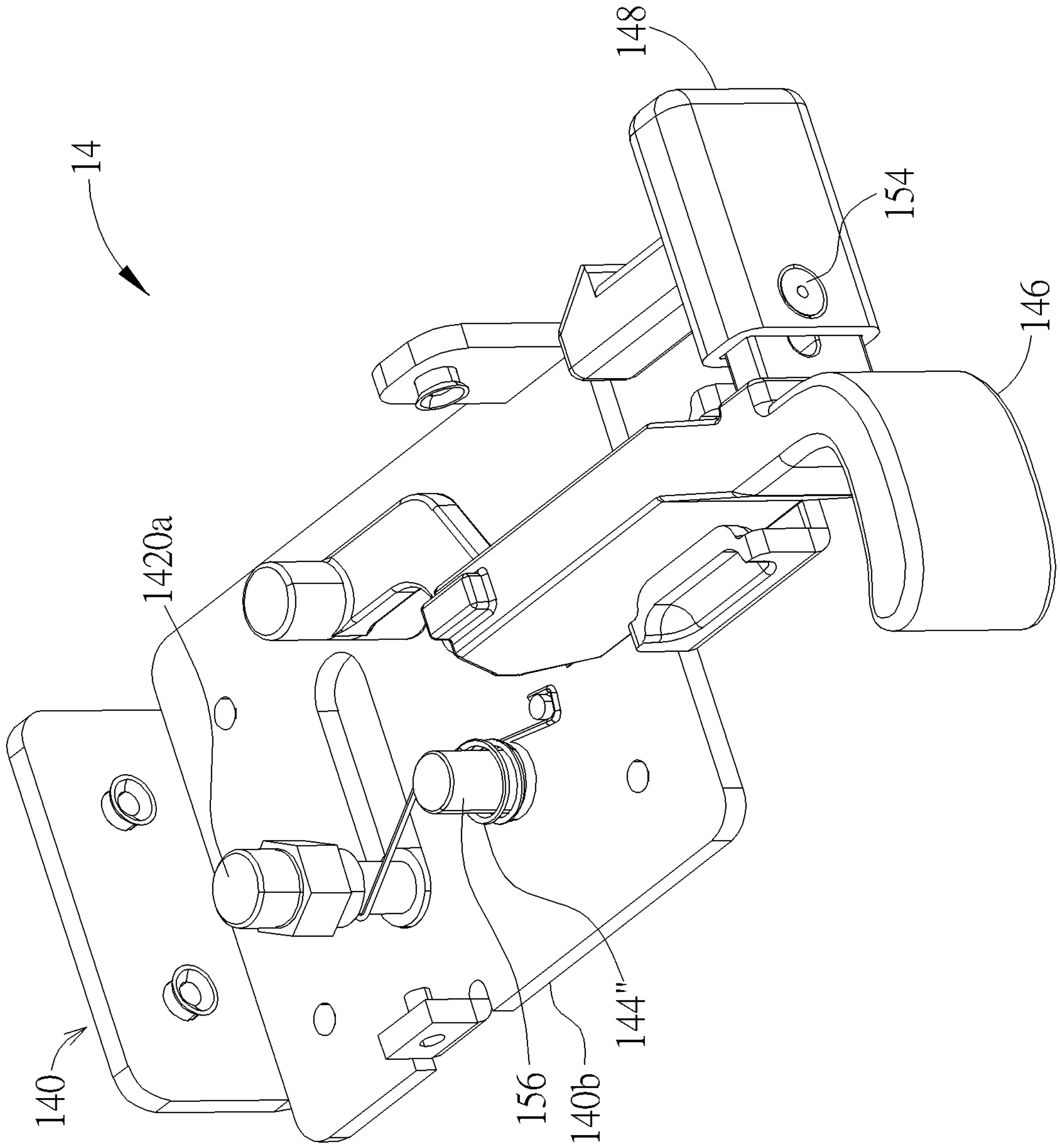
FIG. 10 is a partial perspective view illustrating the lock mechanism equipped with a first elastic member.

Referring to FIG. 10, FIG. 10 is a partial perspective view illustrating the lock mechanism 14 equipped with a first elastic member 144". As shown in FIG. 10, the first elastic member 144" may be a torsion spring, wherein the first elastic member 144" is sleeved on the pivot 156 and opposite ends of the first elastic member 144" are connected to the sliding portion **1420*a* and the lower cover 140*b* of the frame 140. The first elastic member 144 shown in FIGS. 7 and 8 may be replaced by the first elastic member 144" shown in FIG. 10. When the lock mechanism 14 is in a lock state shown in FIG. 7, the first elastic member 144" is twisted. As shown in FIG. 8, when the unlock member 148 is pressed, the first elastic member 144" drives the lock member 142 to move toward the inside of the frame 140 (see the direction of the arrow A2), such that the third engaging portion 1422 disengages from the first engaging portion 100**.

Figure 11:
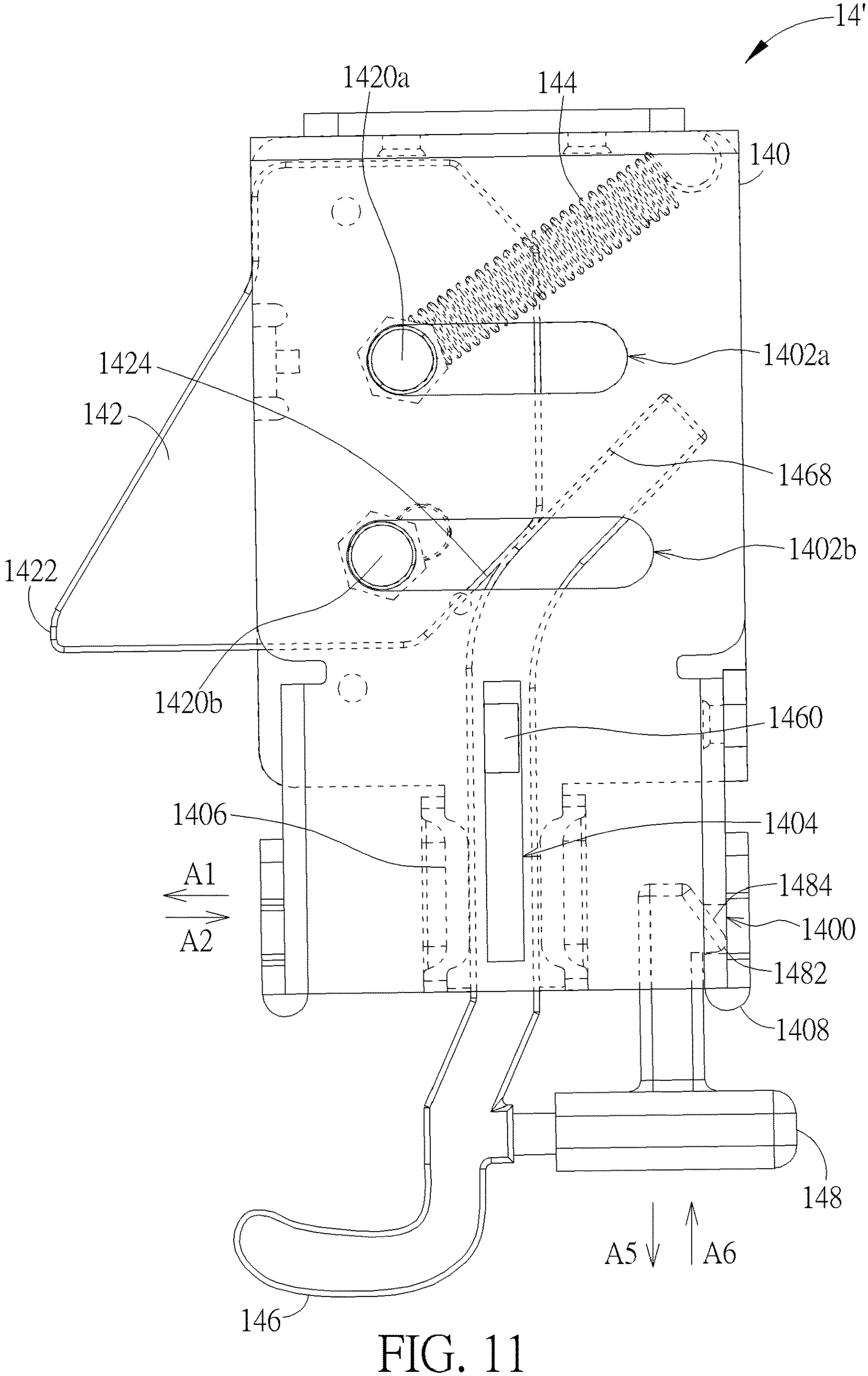
FIG. 11 is a top view illustrating a lock mechanism in a lock state according to another embodiment of the invention.
Figure 12:
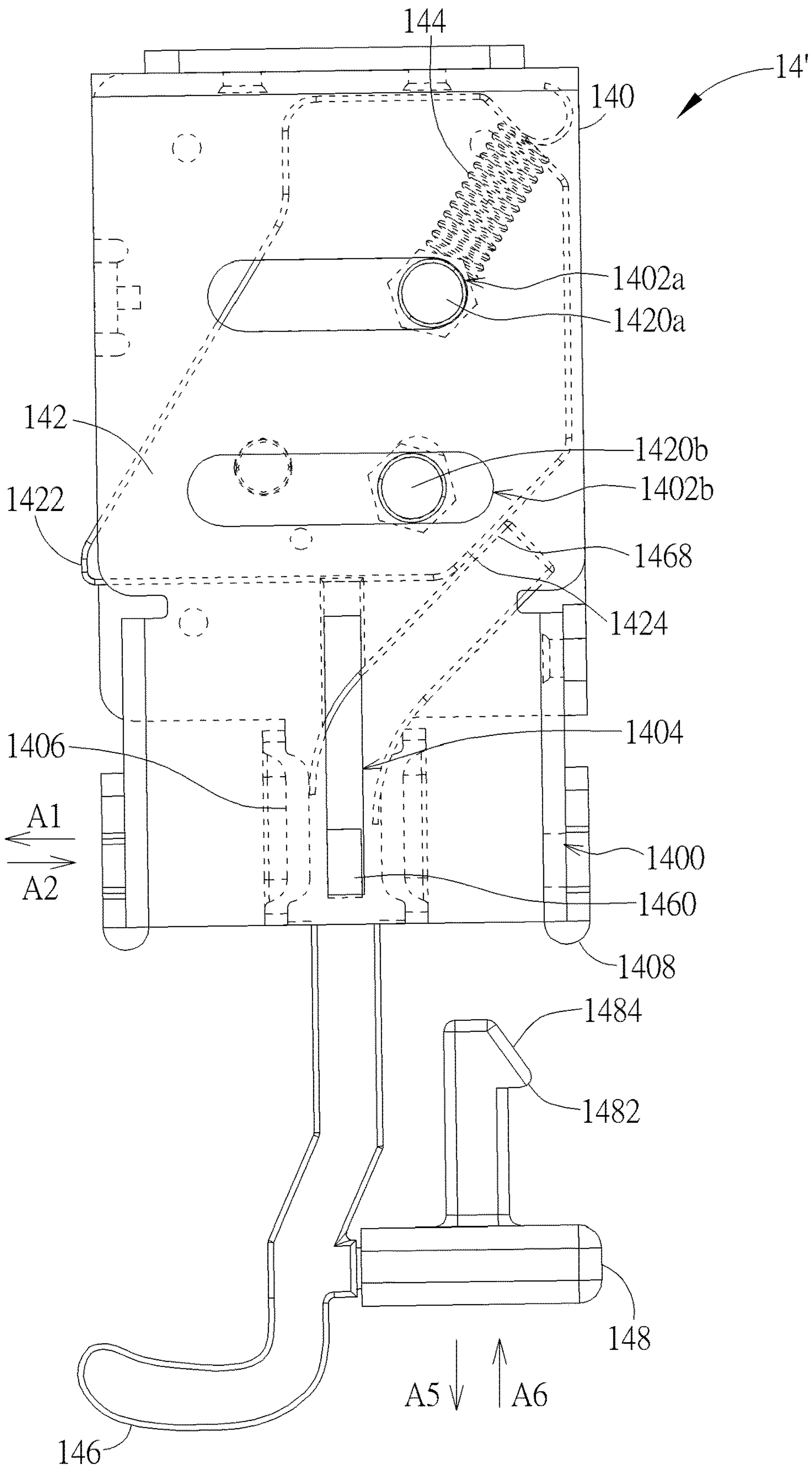
FIG. 12 is a top view illustrating the lock mechanism shown in FIG. 11 in an unlock state.

Referring to FIGS. 11 and 12, FIG. 11 is a top view illustrating a lock mechanism 14' in a lock state according to another embodiment of the invention, and FIG. 8 is a top view illustrating the lock mechanism 14' shown in FIG. 11 in an unlock state.

The main difference between the lock mechanism 14' and the aforesaid lock mechanism 14 is that the lock mechanism 14' does not comprise the aforesaid rotating member 150. As shown in FIGS. 11 and 12, the lock member 142 has a first inclined driving surface 1424 and the operating member 146 has a second inclined driving surface 1468, wherein the first inclined driving surface 1424 abuts against the second inclined driving surface 1468. Thus, when the first elastic member 144 drives the lock member 142 to move toward the inside of the frame 140 (see the direction of the arrow A2), the first inclined driving surface 1424 pushes the second inclined driving surface 1468 to drive the operating member 146 to move toward the outside of the frame 140 (see the direction of the arrow A5). Similarly, when the operating member 146 is pushed toward the inside of the frame 140 (see the direction of the arrow A6), the second inclined driving surface 1468 pushes the first inclined driving surface 1424 to drive the lock member 142 to move toward the outside of the frame 140 (see the direction of the arrow A1). The aforesaid lock mechanism 14 may be replaced by the lock mechanism 14', so as to utilize the lock mechanism 14' to lock the casing 12 in the housing 10. It should be noted that the same elements in FIGS. 11-12 and FIGS. 1-8 are represented by the same numerals, so the repeated explanation will not be depicted herein again. In addition, the first elastic member 144 of the lock mechanism 14' may also be replaced by the first elastic member 144' shown in FIG. 9 or the first elastic member 144" shown in FIG. 10.

Figure 13:
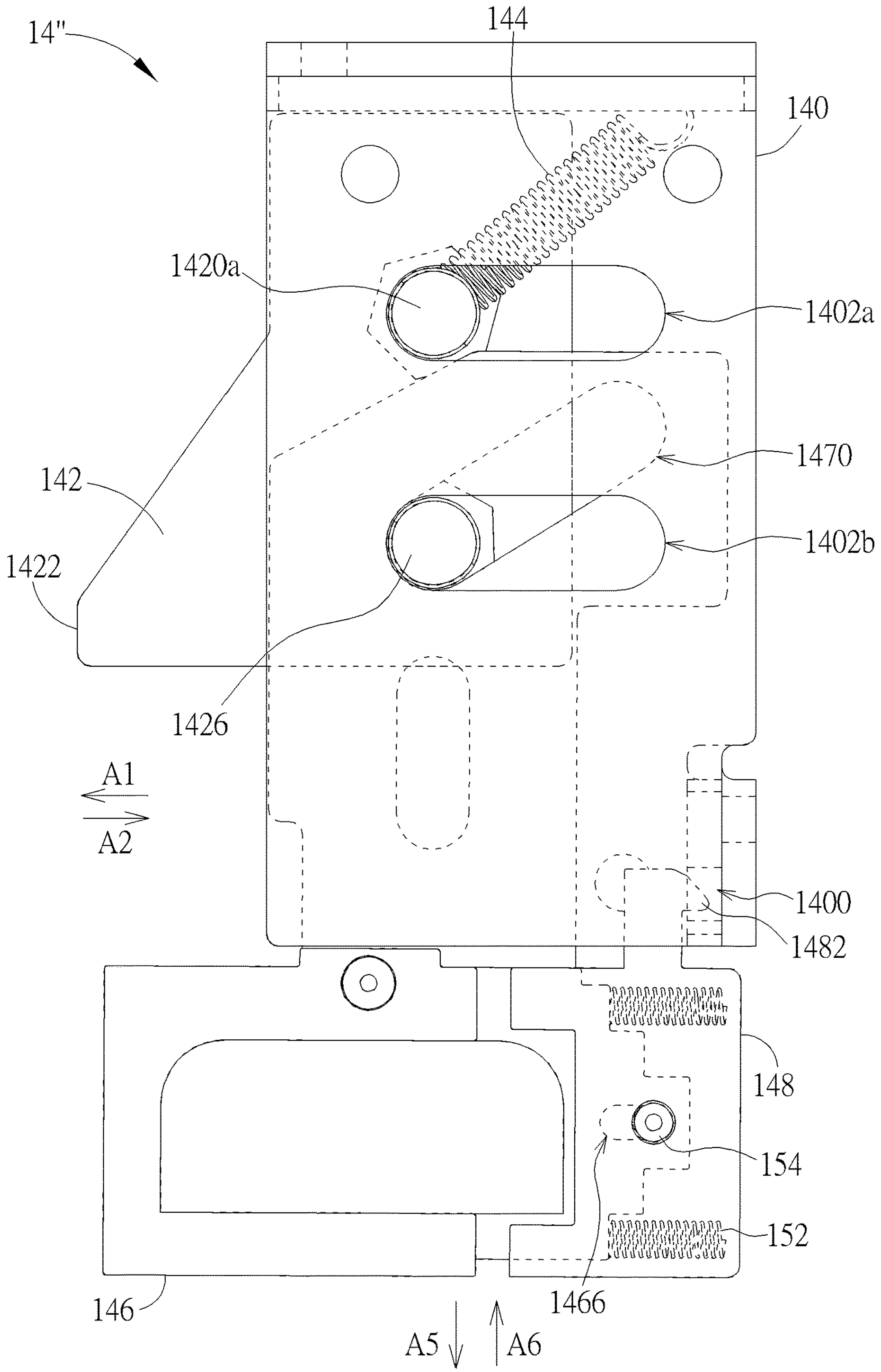
FIG. 13 is a top view illustrating a lock mechanism in a lock state according to another embodiment of the invention.
Figure 14:
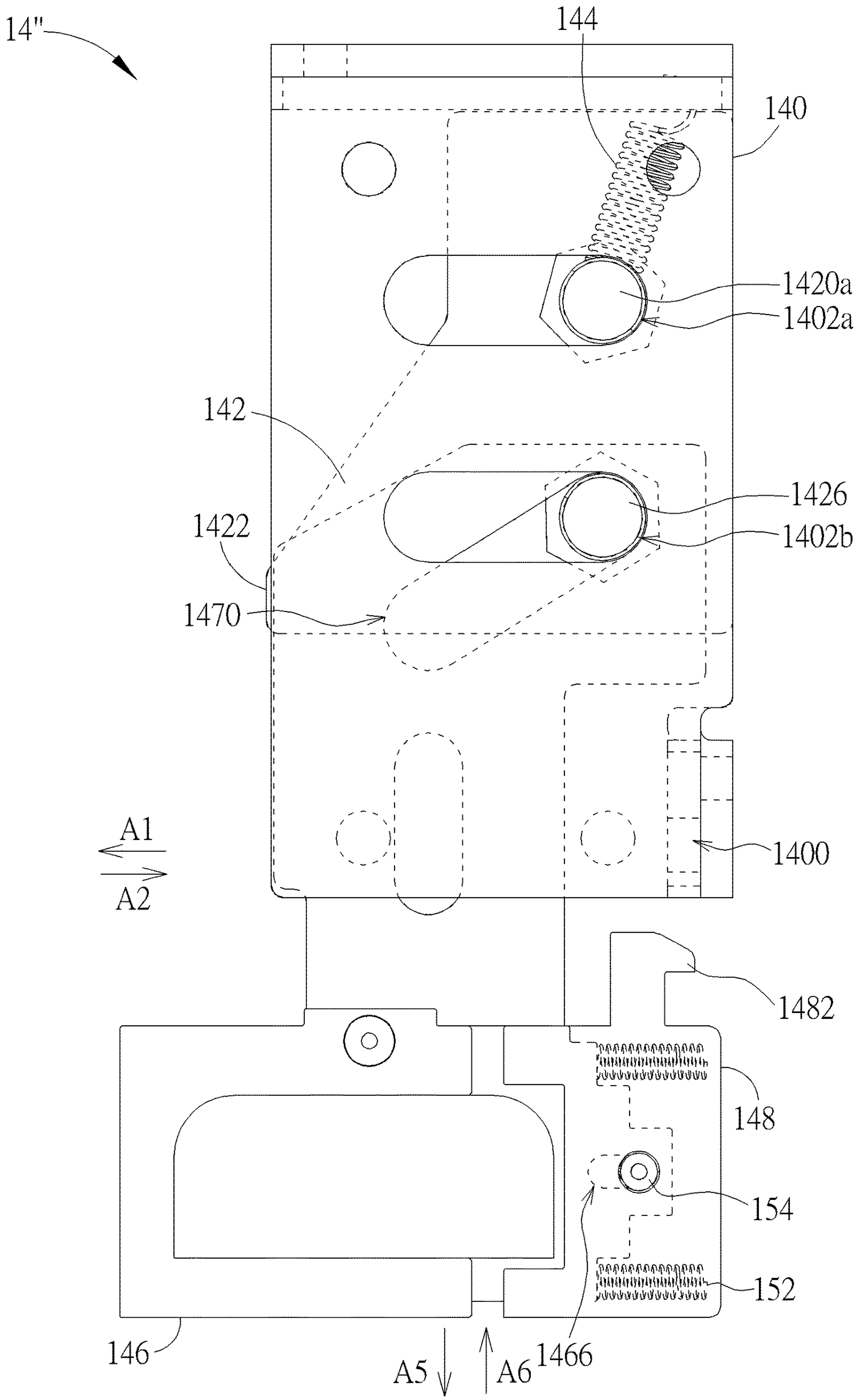
FIG. 14 is a top view illustrating the lock mechanism shown in FIG. 13 in an unlock state.

Referring to FIGS. 13 and 14, FIG. 13 is a top view illustrating a lock mechanism 14" in a lock state according to another embodiment of the invention, and FIG. 14 is a top view illustrating the lock mechanism 14" shown in FIG. 13 in an unlock state.

The main difference between the lock mechanism 14" and the aforesaid lock mechanism 14 is that the lock mechanism 14" does not comprise the aforesaid rotating member 150. As shown in FIGS. 13 and 14, the lock member 142 has a linking portion 1426 and the operating member 146 has a driving groove 1470, wherein the linking portion 1426 is disposed in the driving groove 1470. Thus, when the first elastic member 144 drives the lock member 142 to move toward the inside of the frame 140 (see the direction of the arrow A2), the linking portion 1426 pushes the driving groove 1470 to drive the operating member 146 to move toward the outside of the frame 140 (see the direction of the arrow A5). Similarly, when the operating member 146 is pushed toward the inside of the frame 140 (see the direction of the arrow A6), the driving groove 1470 pushes the linking portion 1426 to drive the lock member 142 to move toward the outside of the frame 140 (see the direction of the arrow A1). The aforesaid lock mechanism 14 may be replaced by the lock mechanism 14", so as to utilize the lock mechanism 14" to lock the casing 12 in the housing 10. It should be noted that the same elements in FIGS. 13-14 and FIGS. 1-8 are represented by the same numerals, so the repeated explanation will not be depicted herein again. In addition, the frame 140, the operating member 146 and the unlock member 148 of the lock mechanism 14" and the frame 140, the operating member 146 and the unlock member 148 of the aforesaid lock mechanism 14 may be design in different shapes according to practical applications, and the principle thereof is not affected by different shapes.

As mentioned in the above, when the user wants to take the casing out of the housing, the user may press the unlock member to disengage the unlock member from the frame. At this time, the first elastic member drives the lock member to move toward the inside of the frame to disengage the lock member from the housing. At the same time, the lock member drives the operating member to move toward the outside of the frame, so as to facilitate the user to hold the operating member. Accordingly, the user may pull the operating member to pull the casing out of the housing easily. In an embodiment, the housing may be a rack for installing a server and the casing may be a chassis of the server. Thus, the lock mechanism of the invention may be configured to lock the chassis of the server in the rack. Since the lock mechanism of the invention is easy to operate and occupies less space, it is beneficial for maintenance and design of the server.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A device with lock function comprising:
- a housing having a first engaging portion;
- a casing disposed in the housing; and
- a lock mechanism disposed in the casing, the lock mechanism comprising:
  - a frame fixed on the casing, the frame having a second engaging portion;
  - a lock member movably disposed in the frame, the lock member having a third engaging portion, the third engaging portion engaging with the first engaging portion to lock the casing in the housing;
  - a first elastic member connected to the lock member;
  - an operating member movably disposed in the frame; and
  - an unlock member movably connected to the operating member, the unlock member having a fourth engaging portion, the fourth engaging portion engaging with the second engaging portion to restrain the operating member;
  - wherein when the unlock member is pressed, the fourth engaging portion disengages from the second engaging portion and the first elastic member drives the lock member to move toward an inside of the frame, such that the third engaging portion disengages from the first engaging portion and the lock member drives the operating member to move toward an outside of the frame.

2. The device with lock function of claim 1, wherein the frame has a sliding groove, the lock member has a sliding portion, and the sliding portion is disposed in the sliding groove.

3. The device with lock function of claim 2, wherein the lock mechanism further comprises a rotating member pivotally connected to the frame, the rotating member has a first driving groove and a second driving groove, the operating member has a linking portion, the sliding portion is disposed in the first driving groove, and the linking portion is disposed in the second driving groove; when the first elastic member drives the lock member to move toward the inside of the frame, the sliding portion pushes the first driving groove to drive the rotating member to rotate; when the rotating member rotates, the second driving groove pushes the linking portion to drive the operating member to move toward the outside of the frame.

4. The device with lock function of claim 3, wherein the rotating member is pivotally connected to the frame by a pivot, the first elastic member is a torsion spring, the first elastic member is sleeved on the pivot, and opposite ends of the first elastic member are connected to the sliding portion and the frame.

5. The device with lock function of claim 3, wherein the housing has a rail and the rotating member has a protruding portion; when the casing is pushed into the housing along the rail, the protruding portion is pushed by the rail to drive the rotating member to rotate; when the rotating member rotates, the first driving groove pushes the sliding portion to drive the lock member to move toward the outside of the frame and the second driving groove pushes the linking portion to drive the operating member to move toward the inside of the frame, such that the third engaging portion engages with the first engaging portion and the fourth engaging portion engages with the second engaging portion.

6. The device with lock function of claim 2, wherein the frame has a positioning groove, the operating member has a positioning portion, the positioning portion is disposed in the positioning groove, and an extending direction of the sliding groove is perpendicular to an extending direction of the positioning groove.

7. The device with lock function of claim 1, wherein the lock mechanism further comprises a second elastic member, the operating member has an inserting portion, the unlock member has a sleeve portion, the sleeve portion is sleeved on the inserting portion, the second elastic member is disposed in the sleeve portion, and opposite ends of the second elastic member are connected to the inserting portion and the sleeve portion.

8. The device with lock function of claim 7, wherein the lock mechanism further comprises a restraining member, the inserting portion has a restraining groove, and the restraining member is disposed on the sleeve portion and located in the restraining groove.

9. The device with lock function of claim 1, wherein the lock member has a first inclined driving surface, the operating member has a second inclined driving surface, and the first inclined driving surface abuts against the second inclined driving surface; when the first elastic member drives the lock member to move toward the inside of the frame, the first inclined driving surface pushes the second inclined driving surface to drive the operating member to move toward the outside of the frame.

10. The device with lock function of claim 1, wherein the lock member has a linking portion, the operating member has a driving groove, and the linking portion is disposed in the driving groove; when the first elastic member drives the lock member to move toward the inside of the frame, the linking portion pushes the driving groove to drive the operating member to move toward the outside of the frame.

11. A lock mechanism comprising:

a frame;

a lock member movably disposed in the frame;

a first elastic member connected to the lock member;

an operating member movably disposed in the frame; and an unlock member movably connected to the operating member, the unlock member engaging with the frame;

wherein when the unlock member is pressed, the unlock member disengages from the frame, the first elastic member drives the lock member to move toward an inside of the frame, and the lock member drives the operating member to move toward an outside of the frame.

12. The lock mechanism of claim 11, wherein the frame has a sliding groove, the lock member has a sliding portion, and the sliding portion is disposed in the sliding groove.

13. The lock mechanism of claim 12, further comprising a rotating member pivotally connected to the frame, wherein the rotating member has a first driving groove and a second driving groove, the operating member has a linking portion, the sliding portion is disposed in the first driving groove, and the linking portion is disposed in the second driving groove; when the first elastic member drives the lock member to move toward the inside of the frame, the sliding portion pushes the first driving groove to drive the rotating member to rotate; when the rotating member rotates, the second driving groove pushes the linking portion to drive the operating member to move toward the outside of the frame.

14. The lock mechanism of claim 13, wherein the rotating member is pivotally connected to the frame by a pivot, the first elastic member is a torsion spring, the first elastic member is sleeved on the pivot, and opposite ends of the first elastic member are connected to the sliding portion and the frame.

15. The lock mechanism of claim 13, wherein the rotating member has a protruding portion; when the protruding portion is pushed to drive the rotating member to rotate, the first driving groove pushes the sliding portion to drive the lock member to move toward the outside of the frame and the second driving groove pushes the linking portion to drive the operating member to move toward the inside of the frame.

16. The lock mechanism of claim 12, wherein the frame has a positioning groove, the operating member has a positioning portion, the positioning portion is disposed in the positioning groove, and an extending direction of the sliding groove is perpendicular to an extending direction of the positioning groove.

17. The lock mechanism of claim 11, further comprising a second elastic member, wherein the operating member has an inserting portion, the unlock member has a sleeve portion, the sleeve portion is sleeved on the inserting portion, the second elastic member is disposed in the sleeve portion, and opposite ends of the second elastic member are connected to the inserting portion and the sleeve portion.

18. The lock mechanism of claim 17, further comprising a restraining member, wherein the inserting portion has a restraining groove, and the restraining member is disposed on the sleeve portion and located in the restraining groove.

19. The lock mechanism of claim 11, wherein the lock member has a first inclined driving surface, the operating member has a second inclined driving surface, and the first inclined driving surface abuts against the second inclined driving surface; when the first elastic member drives the lock member to move toward the inside of the frame, the first inclined driving surface pushes the second inclined driving surface to drive the operating member to move toward the outside of the frame.

20. The lock mechanism of claim 11, wherein the lock member has a linking portion, the operating member has a driving groove, and the linking portion is disposed in the driving groove; when the first elastic member drives the lock member to move toward the inside of the frame, the linking portion pushes the driving groove to drive the operating member to move toward the outside of the frame.

* * * * *